United States Patent [19]

Johnson et al.

[11] 4,358,186
[45] Nov. 9, 1982

[54] METHOD AND APPARATUS FOR CONTROLLING EXPOSURE BY SELECTIVE USE OF BLOCKING VISIBLE FILTER

[75] Inventors: Bruce K. Johnson, Andover; John B. Millard, Cohasset, both of Mass.

[73] Assignee: Polaroid Corporation, Cambridge, Mass.

[21] Appl. No.: 108,547

[22] Filed: Dec. 31, 1979

[51] Int. Cl.³ .................... G03B 7/099; G03B 11/00
[52] U.S. Cl. ........................................ 354/27; 354/30; 354/33; 354/59; 354/139; 356/225
[58] Field of Search ................ 354/27, 28–30, 354/31, 26, 33, 34, 38, 42, 43, 49, 50, 59, 128, 139, 149; 350/1.1–1.4, 195, 196; 250/482; 356/215, 224, 225

[56] References Cited

U.S. PATENT DOCUMENTS

| | | |
|---|---|---|
| 2,015,261 | 9/1935 | Eckler . |
| 2,086,791 | 7/1937 | Dresler . |
| 2,380,216 | 7/1945 | Carter . |
| 2,585,245 | 2/1952 | Harrison . |
| 2,841,064 | 7/1958 | Bagby . |
| 3,006,265 | 10/1961 | La Rue . |
| 3,045,124 | 7/1962 | McKinlay ........................ 250/226 |
| 3,053,159 | 9/1962 | Bagby . |
| 3,173,347 | 3/1965 | Stimson et al. . |
| 3,176,599 | 4/1965 | Anwyl . |
| 3,208,363 | 9/1965 | Easterly et al. . |
| 3,229,569 | 1/1966 | Frost et al. . |
| 3,270,638 | 9/1966 | Anwyl . |
| 3,314,349 | 4/1967 | Koeber . |
| 3,397,023 | 8/1968 | Land ............................... 350/160 |
| 3,468,228 | 9/1969 | Rogers . |
| 3,500,730 | 3/1970 | Matsubara ........................ 356/225 |
| 3,536,408 | 10/1970 | Norwood .......................... 356/219 |
| 3,583,299 | 6/1971 | Land ............................... 250/205 |
| 3,589,258 | 6/1971 | Koeber . |
| 3,623,411 | 11/1971 | Gunther et al. . |
| 3,672,281 | 6/1972 | Land . |
| 3,709,615 | 1/1973 | Blakeslee et al. .................. 356/224 |
| 3,780,631 | 12/1973 | Schulman ..................... 356/225 X |
| 3,785,265 | 1/1974 | Lardeau . |
| 3,792,649 | 2/1974 | Douglas ............................ 354/192 |
| 3,832,722 | 8/1974 | Douglas ............................. 354/29 |
| 3,864,701 | 2/1975 | Knause ............................. 354/49 |
| 3,873,987 | 3/1975 | Bräuning ........................... 354/26 |
| 3,893,134 | 7/1975 | Bräuning ........................... 354/30 |
| 3,896,458 | 7/1975 | Johnson ............................ 354/30 |
| 3,903,413 | 9/1975 | Manning .......................... 250/226 |
| 3,942,183 | 3/1976 | Whiteside .......................... 354/29 |
| 3,942,184 | 3/1976 | Blinow ............................. 354/42 |
| 3,963,333 | 6/1976 | Mueller ............................. 352/72 |
| 4,040,070 | 8/1977 | Hochreiter ......................... 354/59 |
| 4,040,072 | 8/1977 | Johnson ............................ 354/173 |
| 4,104,653 | 8/1978 | Johnson ............................ 354/27 |
| 4,147,418 | 4/1979 | Whiteside .......................... 354/27 |
| 4,156,564 | 5/1979 | Tsunekawa ........................ 354/59 |
| 4,160,588 | 7/1979 | Beach .............................. 354/31 |
| 4,304,476 | 12/1981 | Bloom ............................. 354/49 |
| 4,316,659 | 2/1982 | Daniels ............................ 354/42 |

FOREIGN PATENT DOCUMENTS

| | | |
|---|---|---|
| 3036522 | 4/1981 | Fed. Rep. of Germany . |
| 1001537 | 8/1965 | United Kingdom ............... 350/196 |

*Primary Examiner*—G. Z. Rubinson
*Assistant Examiner*—S. D. Schreyer
*Attorney, Agent, or Firm*—Leslie J. Payne

[57] ABSTRACT

Method and apparatus for automatically controlling exposure of a photographic film by evaluating selected spectral scene light frequencies during certain ambient light portions of an exposure interval and evaluating scene light frequencies exclusive of visible frequencies during other portions of the interval.

16 Claims, 7 Drawing Figures

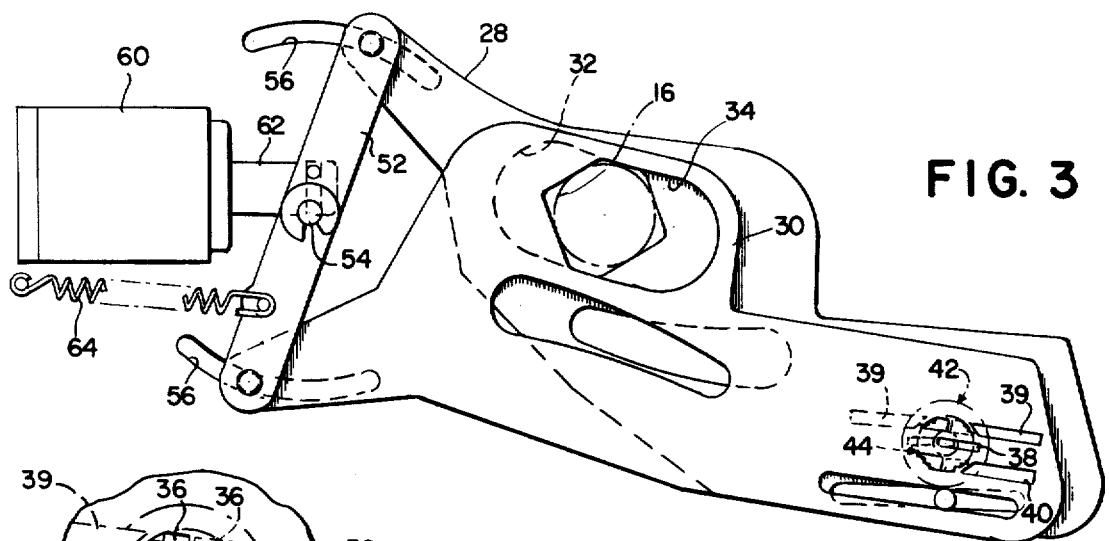
FIG. 3
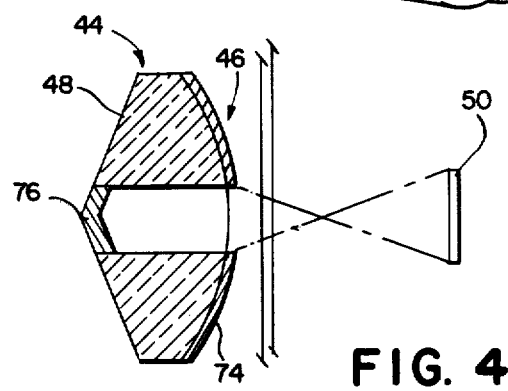
FIG. 3A
FIG. 4
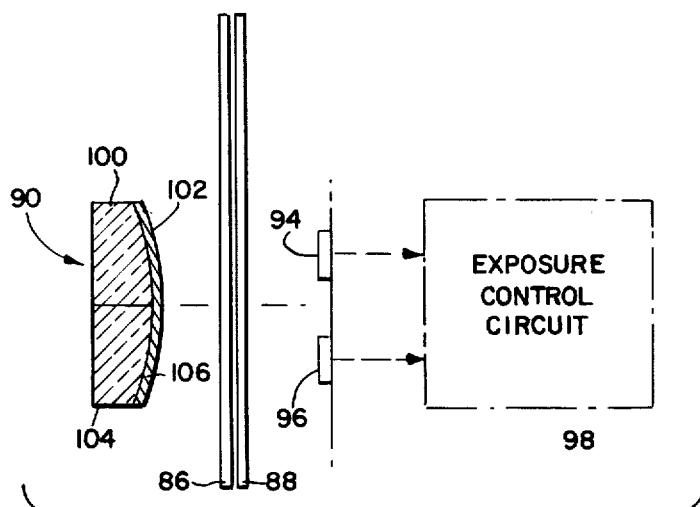
FIG. 6
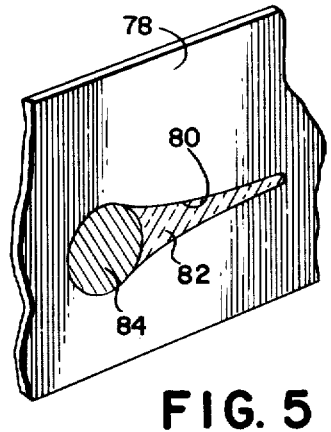
FIG. 5

METHOD AND APPARATUS FOR CONTROLLING EXPOSURE BY SELECTIVE USE OF BLOCKING VISIBLE FILTER

BACKGROUND OF THE INVENTION

This invention relates generally to the photographic field and, more particularly, an improved method and apparatus control system for automatically and selectively controlling the filtering of scene radiation incident upon a photoresponsive element during exposure.

Automatic light responsive control systems are well known in the photograhic arts. Essentially, these systems evaluate scene brightness levels of illumination for controlling exposure parameters, including effective aperture size and exposure interval, as a function of scene brightness evaluated against the sensitometric characteristics of the film being used. Typically, scene brightness evaluation is performed with light-measuring circuits including one or more photoresponsive elements.

One such automatic exposure control system employs scanning type shutter blades. Exemplary scanning shutter blades usable in exposure control systems are generally disclosed in U.S. Pat. No. 3,942,183, issued Mar. 2, 1976, to George Whiteside; and U.S. Pat. No. 4,104,653, issued Aug. 1, 1978, to Bruce K. Johnson et al., all of which are presently assigned with the present application. As described in these patents, there are cooperating pairs of primary and secondary apertures formed in the shutter blades. These pairs of apertures cooperate respectively for blocking and unblocking the passage of light through an exposure opening to a film plane and through a photocell opening to a light sensing or photoresponsive cell used for controlling blade positioning. Durinrg the exposure cycle, the secondary apertures operate in conjunction with the photocell and a control circuit to define both the aperture values achieved and the exposure interval as a function of the amount of light received through the secondary apertures. In such systems, photoresponsive elements of the silicon type are commonly used because they, among other things, have excellent long term stability and linearity of output signal with input light power changes.

For optimizing the quality of the resultant photographs when using automatic exposure control systems, such as the type noted, it is known to employ spectral correction filters to correlate the spectral sensitivity curve of the photoresponsive element more closely with that of the photographic color film. Without such a filter, the photocell would react to the scene frequencies, such as infrared (IR), and cause the control circuit to terminate exposure earlier than desired. This is especially the case when the photocell is of the silicon type because such a photocell tends to be red (IR) sensitive. For providing the desired correction, a spectral correction filter is interposed in the photocell's optical path, for example, as described in U.S. Pat. No. 3,903,413, issued on Sept. 2, 1975, to Monis Manning; and commonly assigned with the present application. This patent discloses use of a silicon photodiode, sensitive to radiant energy between about 350 nm and 1200 nm, whereas the sensitivity of typical color photographic film is confined to the visible region of the spectrum, i.e., from about 400 nm to about 700 nm. Use is made of a spectral correction filter with peak absorption in the near-infrared region (700–1200 nm) and high transmission in the visual region to correct or generally match the spectral response of the photocell in relation to the film. This matching of sensitivities is particularly useful in cameras employing diffusion transfer photographic processes of the so-called "instant photography" type where errors in the exposure cannot be later compensated for as is possible with film subsequently developed in a photographic laboratory.

While use of infrared filters serve satisfactorily, complications can arise when reflectivities of different objects in photographic scenes exhibit widely disparate values, for example, where the exposure of the subject's facial skin is adversely affected by widely disparate reflectivities of the surrounding clothing or other objects, particularly in close-up situations. Partly as a result of this, it has been found advantageous to remove the infrared filter in flash exposure modes of operation.

Consequently, although retention of spectral correction filter in the photocell's optical path has been practiced during both ambient and artificial illumination modes, as disclosed in U.S. Pat. No. 4,040,070, issued on Aug. 2, 1977, to W. Hochreiter et al., a spectral correction filter is removed from the photocell's optical path when the flash mode is desired. This removal is achieved, upon attaching a flash unit to the camera, by actuation of a relatively complicated mechanical arrangement which swings the filter out of the optical path.

Still other known prior art is described in U.S. Pat. No. 3,468,228, issued on Sept. 23, 1969, to Howard G. Rogers, which provides automatic sequential positioning of a pair of dual filters over photocell and exposure apertures to attain a color balance exposure of photosensitive material.

Approaches have been developed which represent substantial improvements over those known in the prior art. In this regard, copending applications entitled "Apparatus For Varying the Spectral Filter Over the Photocell as a Function of Blade Position", of Milton Dietz; "Method and Apparatus For Selective Positioning of Spectral Filter During Exposure Control", of Bruce K. Johnson et al.; and "Method and Apparatus For Selective Positioning of Spectral Filter During Exposure Control", of Bruce K. Johnson; Ser. Nos. 110,811 U.S. Pat. No. 4,325,616, 108,219 and 108,546, now abandoned in favor of continuation-in-part application Ser. No. 156,198 filed June 3, 1980; respectively, concurrently filed herewith and commonly assigned herewith disclose exposure control systems for automatically controlling scene light intensity and spectral filtering thereof during an exposure interval as a function of blade mechanism which itself is a function of the scene light intensity. More specifically, they remove a blocking infrared filter from the optical path of a photocell detector during a portion of the exposure interval generally corresponding to low ambient light conditions under which transient illumination in the form of a strobe is fired. These systems operate extremely satisfactorily. The foregoing approaches, however, are intended during low ambient light conditions, in which the flash is fired, evaluate scene radiation including both visible and infrared frequencies. Although the relatively uniform reflectivity response of the infrared frequencies significantly compensates for the widely disparate reflectivities of visible light of the different objects in photographic scenes, they do not entirely eliminate the effect of the disparate reflectivity values of the visible spectrum during this strobe firing. Accordingly, it is desirable to substantially eliminate the disparate visible light reflectivity values giving rise to inaccurate evaluations of scene brightness during a strobe firing condition.

SUMMARY OF THE INVENTION

In accordance with the present invention, an improved method and apparatus automatically controls exposure of a photographic film in accordance with selected spectral scene light frequencies during a predominantly ambient portion of an exposure interval and in accordance with such scene light to the general exclusion of visible spectral frequencies during at least a portion of the flash portion of the exposure interval.

In an illustrated embodiment of this invention, there are provided means for mounting photographic film material at a given focal plane and means for directing image forming light rays from the scene along a given path to the focal plane. In this embodiment, there are means for unblocking and blocking passage of scene light along the path as well as means for evaluating radiation from the scene during an evaluation period. Included in this embodiment are means responsive to the evaluating means for controlling the unblocking and blocking means in accordance with an accumulated total of scene radiation sensed by the evaluating means for controlling the unblocking means to define an exposure interval of the film at a given exposure interval.

In a preferred embodiment, this invention provides means for substantially evaluating spectral frequencies of scene radiation substantially exclusive of visible spectral frequencies during at least one portion of the evaluation period. This arrangement serves to substantially minimize the adverse effects of widely disparate scene light reflectivity values on exposure. In such embodiment while the visible spectral frequencies have been blocked, such scene radiation as infrared is not. In fact, in a preferred embodiment, the evaluating means includes an integral photocell lens having one portion passing visible scene light frequencies, but blocking infrared frequencies while another portion blocks visible scene light frequencies, but passes infrared frequencies.

Among the objects of the invention are, therefore, the provision of an improved exposure control system capable of selectively blocking visible light during at least a segment of an evaluation period, the provision of an improved photographic camera employing the last noted exposure control system, and the provision of an improved method of providing improved photographic exposure control by selectively blocking visible light frequencies during at least a portion of an evaluation period.

Other objects and further scope of applicability of the present invention will become apparent from the detailed description to follow when taken in conjunction with the accompanying drawings in which like parts are designated by like reference numerals.

BRIEF DESCRIPTION OF THE DRAWINGS

FIG. 3 is an elevational view diagrammatically depicting the blade mechanism of the exposure control system of FIG. 1 in a scene light admtting arrangement;

FIG. 3A is an enlarged fragmented view diagrammatically depicting the sweep photocell aperture relation to a photocell;

FIG. 4 is a diagrammatic view illustrating the arrangement of the photocell lens, the shutter blades and the spectral filter;

FIG. 5 is a diagrammatic view illustrating another embodiment wherein the secondary sweep aperature includes distinct visible blocking and infrared blocking filters; and FIG. 6 is a diagrammatic view illustrating an exposure control system embodying dual photocells and dual spectral filters.

DETAILED DESCRIPTION

Figure 1:
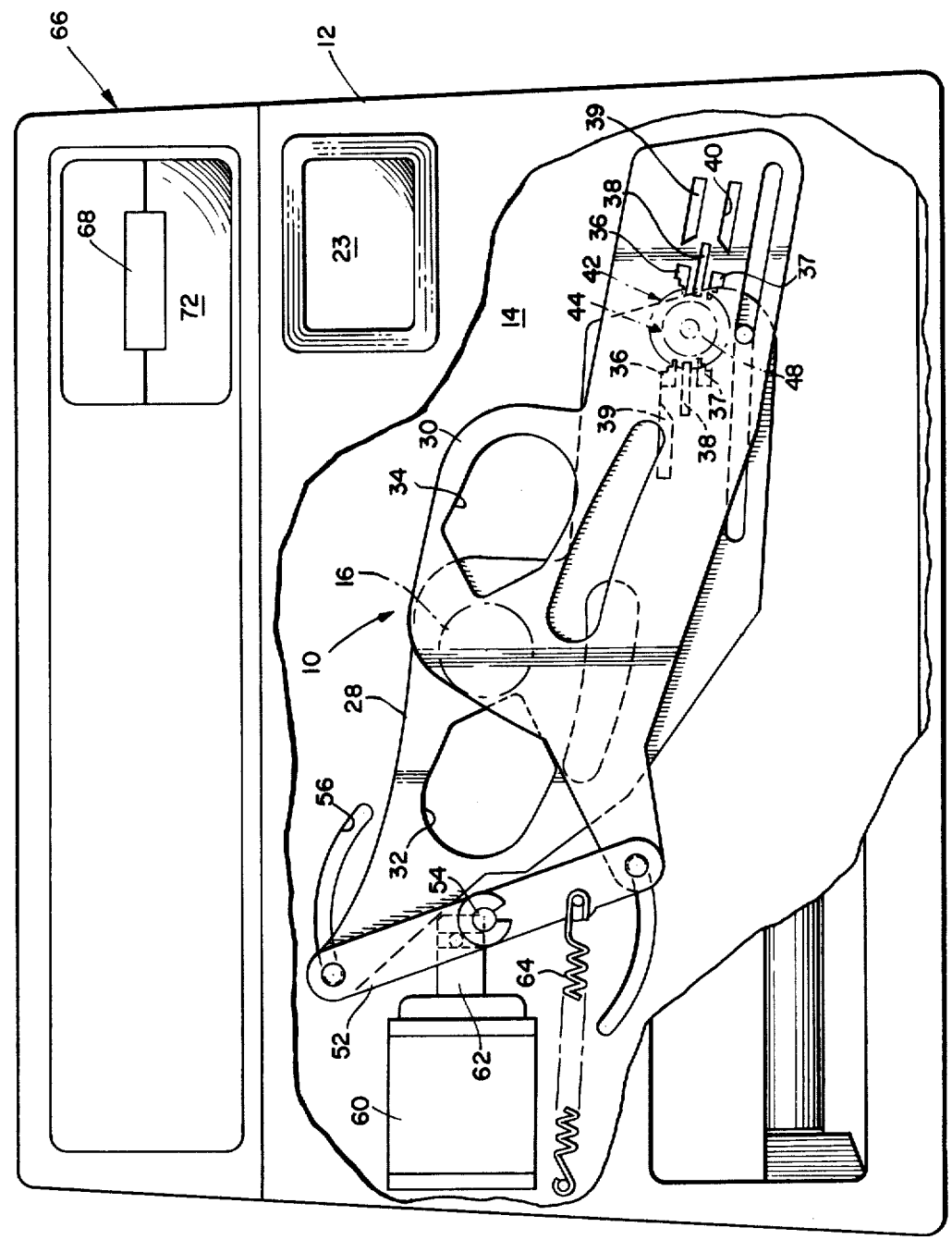
FIG. 1 is a front elevational view diagrammatically depicting a photographic camera embodying an improved exposure control system with a blade mechanism in a scene light blocking arrangement.
Figure 2:
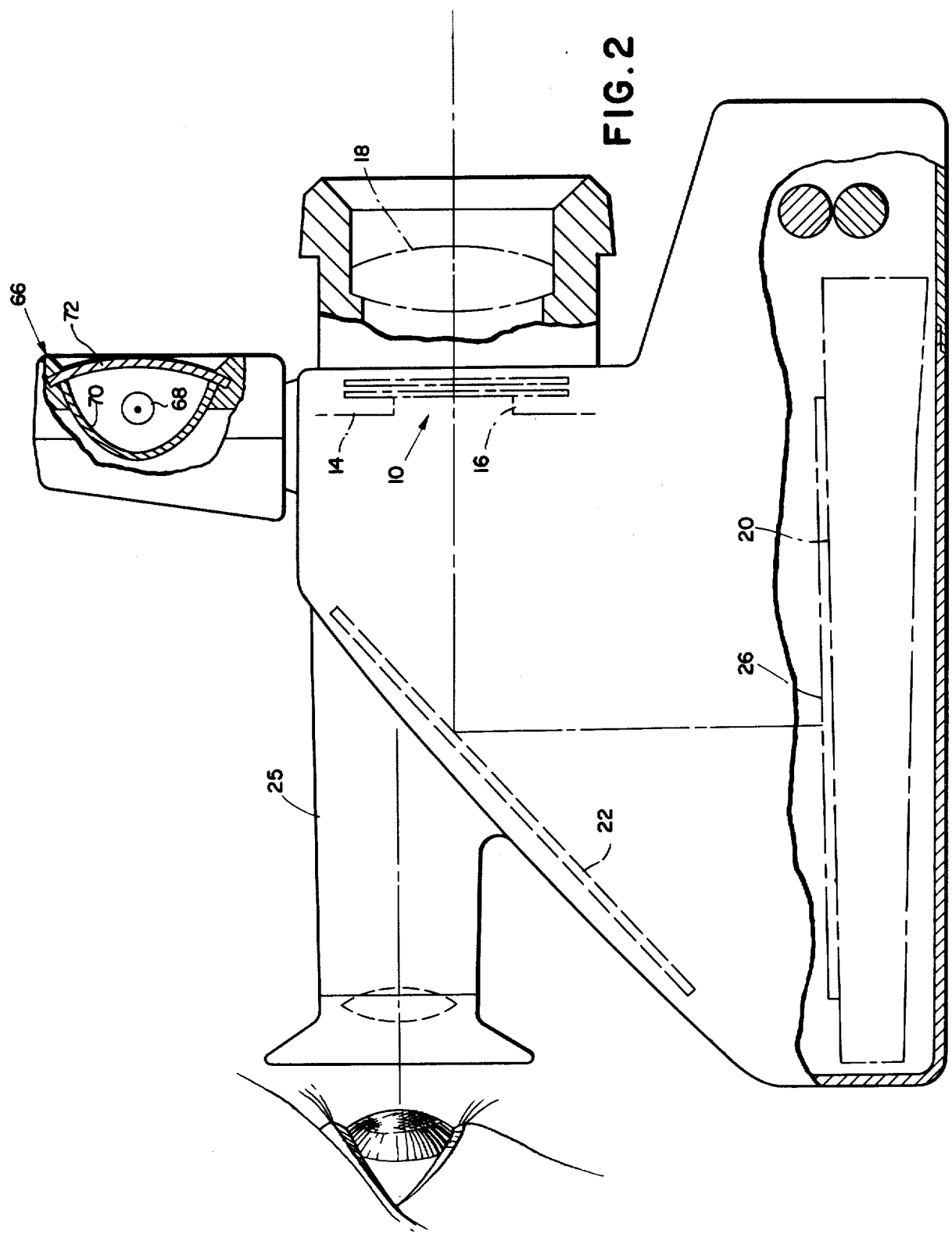
FIG. 2 is a side elevational view diagrammatically depicting a photographic camera embodying the exposure control system shown in FIG. 1.

Referring now to FIGS. 1 and 2, there is shown generally at 10 a photographic exposure control system. The system 10 is disposed in camera housing 12 and is operatively connected to a baseblock casting 14 which is selectively machined for supporting various components of this system. Disposed centrally within the casting 14 is a light entry exposure opening 16 defining the maximum available exposure aperture for the system. Provided in overlying relation to the light entry opening 16 is an objective or taking lens 18 for focusing image carrying rays through the light exposure opening. In this embodiment, the taking lens 18 may be of the fixed focus type. Variable focus lens systems, in lieu of the fixed focus kind, may also be provided. Image carrying rays from the scene to be photographed are directed by the taking lens 18 rearwardly to a photographic film unit (not shown) of a film pack 20 by way of a reflecting mirror 22 stationed in a suitable lighttight film exposure chamber 24. Each of the film units of the film pack 20 is successively positioned at the focal plane 26 of the camera. Examples of such a film pack 20 are described in U.S. Pat. Nos. 3,543,662; 3,705,542; 3,748,484; 3,779,770; and 4,040,072.

Although the above exposure control system 10 has been described for use with photographic cameras of the non-reflex type, the intended scope of this invention is by no means so limited. Accordingly, cameras of the well-known reflex type, such as described in U.S. Pat. No. 3,672,281, entitled "Reflex Camera", by E. H. Land, commonly assigned herewith, may be equally suitable for embodying the exposure control system of this invention.

Additionally, a viewing window 23 is located in the front face of the camera housing 12 and operates in conjunction with a viewing system 25 for permitting viewing and framing of the scene to be photographed by the operator.

As best shown in FIG. 1, intermediate the objective lens 18 and the light entry exposure opening 16 is provided a shutter blade mechanism comprising two overlapping shutter blade elements 28 and 30 of the so-called "scanning type" which will be subsequently described in greater detail herein. A pair of scene light admitting primary apertures 32 and 34 are provided respectively in the blade elements 28 and 30 to provide overlapping relationship to the light entry exposure opening 16 and thereby to cooperatively define a progressive variation of effective aperture values thereat in accordance with simultaneous longitudinal and lateral displacement of one blade element with respect to the other blade element. Such kind of displacement is fully described in U.S. Pat. No. 3,942,183, entitled "Camera With Pivoting Blades", by George Whiteside, issued Mar. 2, 1977, in common assignment herewith and now incorporated by reference herein.

Each of the shutter blades 28 and 30 additionally include a plurality of secondary apertures. In the illustrated embodiment, a plurality of sets of sweep secondary apertures are generally indicated by reference numerals 36, 37, 38, 39, 40. Reference is made to the noted copending application Ser. Nos. 108,219 and 108,546, now abandoned in favor of continuation-in-part application Ser. No. 156,198 filed June 3, 1980 for describing in detail the structure and operation of the shutter blades and sweep apertures for controlling passage of light to a light detecting station 42. Thus, only those details thereof necessary for an understanding of the present embodiment will be set forth. Essentially, the sets of seconday apertures 36, 37, 38, 39, 40 move in correspondence with the primary apertures 32, 34 and progressively with each other for defining progressively varying and distinct sets of secondary aperture values as a function of blade positioning during exposure. Also, these sweep apertures cooperatively coincide with a photoresponsive device or photometer 44 including spectral filter system 46 for effectively and automatically controlling the intensity and spectral frequency of scene light passing to the light detecting station 42 as a function of shutter blade positioning during an exposure interval.

This photometer 44 is aligned with a photocell light entry window (not shown) in the housing 12. Preferably, the photometer 44 includes a photocell lens 48 and a photodetector 50 of the silicon photodiode type. Also, included in the light detecting station 42 is a control circuit (not shown) for collectively operating with the photometer 44 for effecting termination of the exposure interval as a function of time integration of the intensity of light incident upon the photodetector 50 as permitted by the overlapping sets of photocell sweep apertures 36-40. Also, the above-described light detecting station 42 is described in the last noted copending U.S. patent applications and does not, per se, form an aspect of the invention. Hence, only those details needed for an understanding of the present invention will be given.

Returning to a brief description of the shutter blade mechanism, it will be understood that distal ends of the shutter blades 28, 30 are pivotally connected to distal ends of a walking beam 52. In turn, the walking beam 52 is pivotally connected to the block casting 14 by a pivot pin 54 and its distal ends have pin members extending through respective openings in the respective blade elements which pins slidably engage respective arcuate slots 56 formed in the casting 14 for prohibiting shutter blade disengagement during exposure control operations.

Displacement of these shutter blades 28, 30 relative to each other and to the photocell lens 48 and thus to the spectral filter system 46 is provided, in part, by a tractive electromagnetic device or solenoid 60. Included in such solenoid 60 is an internally arranged and movable cylindrical plunger unit 62 which is affixed to the walking beam 46 and retracts upon solenoid energization. Thus, longitudinal displacement of the plunger unit 62 is effective for rotating the walking beam 52 about the pivot pin 54. In so doing it causes appropriate displacement of the shutter blades 28, 30 in a known manner to a scene light blocking condition of (FIG. 1). For continuously urging the primary apertures 32, 34 and the sets of secondary sweep apertures 36–40 to positions defining their effective aperture values, there is provided a biasing spring 64. Thus, when the solenoid 60 is deenergized, the spring 64 drives the blades 28, 30 toward their maximum open positioning.

For purposes of battery power conservation, there is provided a latch mechanism (not shown) operable automatically at the end of each exposure for latching the walking beam 52 in the scene light blocking position shown in FIG. 1. Hence, the solenoid 60 is deenergized when the blades 28, 30 are in the scene light blocking condition. Unlatching of the latch mechanism commences upon exposure. Details of this latching mechanism including its operation do not per se form an aspect of this invention; therefore, reference is made to U.S. Pat. No. 4,040,072, issued Aug. 2, 1977, and assigned in common herewith for a more complete description thereof.

Reference is now made to the flash strobe unit 66 of the present embodiment. In essence, the electronic flash strobe unit 66 is cooperatively associated with the photographic camera apparatus to contribute a predetermined proportion, i.e., fill flash of the scene light admitted by the shutter blade mechanism to expose the film in a manner to be subsequently described. Since the operation and structure of this fill flash does not, per se, form an aspect of the present invention, only those details necessary for an understanding of the present invention will be described. For a more detailed description of this electronic flash apparatus and its cooperation with the scanning shutter blades 28, 30, reference is again made to the last noted applications. The electronic flash strobe unit 66 is affixed to an upper surface of the camera housing 12. Included in the unit 66 is a flash discharge tube 68 located in a suitable reflector 70 behind a lens 72. A quench tube (not shown) is provided for interrupting the flash discharge of the flash discharge tube 68 and electric power for the electronic flash strobe unit 56 is provided by a battery (not shown) carried in the film pack 20. Briefly, as described in the above-mentioned application, the output signal from a light integrator circuit (not shown) of the scene light detecting station 42 is directed to three level detector circuits (not shown) which all may be of a well-known design, such as a Schmitt trigger. The output from one of these level detectors controls a flash fire trigger circuit (not shown) of the electronic strobe unit 66. The second level detector is effective to control the energization of the solenoid 60, and the third level detector is effective to control a flash quench circuit (not shown). Also, a flash time delay circuit (not shown), which receives an input signal upon the deenergization of the solenoid 60, is included to provide a time delayed flash fire signal operativve to trigger the flash under very low ambient light conditions as later explained in the last noted applications. The time delay provided by the flash delay circuit may be in the order of 65±4 msec. Finally, a shutter time out circuit (not shown) is also provided as described in the noted copending application.

Specific reference is made to FIG. 4 for describing the photocell 44 in greater details. The photocell lens 48 is linearly spaced from the silicon photocell detector 50, the latter of which produces a current output responsive to incident scene radiation thereon. In the illustrated embodiment, the photocell lens 48 is of the focusing type and is in optical alignment with the photocell light entry window (not shown) in the front face of the camera housing 12. Positioned intermediate the photcell lens 48 and the silicon photocell detector 50 is the pair of scanning shutter blades 28, 30. Positioning of the shutter blades 28, 30 relative to the photocell lens 48 is carried out to insure that the secondary sweep apertures 36–40 direct preselected portions of spectrally filtered scene radiation passing through the filter system 46 to the photodetector 50 for purposes subsequently explained.

For purposes of carrying out the selective attenuation of spectral energy in accordance with this invention, the spectral filter system 46 includes an annular coating 74 on the rear face of the photocell lens 48 for blocking infrared radiation (IR), but passing visible light frequencies. Also, the IR filter can be dispersed inside the lens 48. This coating 74 is in the form of an annulus, such as best observed from FIG. 3A. Such filtering system 46 includes in a hollow center portion of the photocell lens 48 a blocking visible lens filter 76 which allows IR radiation to the photocell detector 50, but serves to substantially block the visible spectral frequencies. The significance of this relationship in modifying exposure control will be explained subsequently.

Referring back to the blocking IR filter 74, it is fabricated to attenuate spectral energy within the broad wavelength range to which the photodetector 50 is sensitive (e.g., 360–1200 nm) and, preferably, to remove substantially all the spectral energy in the near IR region (e.g., 700–1200 nm) of the photocell range. Thus, visible spectral energy remains after passing the IR filter 74. The visible blocking filter 76 is fabricated of material for attenuating spectral energy within the visible spectrum range (i.e., 400–700 nm). Thus, infrared radiation is permitted to pass to the photodetector 50, while the visible light is precluded. However, both filters 74 and 76 can be made to selectively leak IR frequencies and visible frequencies and visible frequencies; respectively.

Prior to describing the improved spectral filtering for exposure control in detail, it should be first explained that the novel arrangement of the photocell lens 48, the spectral filters 74, 76 and the sweep apertures 36–40 automatically provide alternate IR and visible light absorptive filtering of the scene radiation input to the photodetector 50 during stroke of shutter blades 28, 30. It is intended that at moderate-to-high light levels, the scene light being passed to the photodetector 50 is subjected to the blocking IR filters 74. This is desired since the ambient contribution is most important under such conditions and, therefore, control of IR radiation is important. Under lower levels of scene brightness and greater blade scan movement, as will be explained, the IR frequencies are passed on to the photodetector 50 while the visible light frequencies are blocked. This minimizes the affect widely disparate reflectivity values, in the visible range, would have in adversely affecting exposure.

Broadly, the secondary apertures 36–40 operate in conjunction with the filter system 46 and lens 48 to provide means for substantially permitting transmission of selected frequencies, such as visible, while blocking transmission of other selected frequencies, such as infrared, during an earlier portion of blade scan and, hence, the exposure interval, while precluding transmission of the previously transmitted frequencies during a later portion of blade scan and simultaneously blocking the previously transmitted frequencies when the scan causes larger aperture values as under low light conditions.

Operation of a camera actuator button (not shown) powers up the camera and enables the strobe unit 66 for subsequent firing and effects release of the shutter latch mechanism to allow shutter blade movement to commence the exposure cycle. More specifically, the shutter blades 28 and 30 move in opposite directions from the scene light blocking condition of FIG. 1 toward a maximum primary aperture value, such as shown in FIGS. 3 and 3A. Thus, the effective aperture area over the light entering exposure opening 16 is enlarged progressively. Simultaneously, the secondary photocell sweep apertures likewise define corresponding progressively varying secondary effective aperture values relative to the light in detecting station 42.

During initial sweep of the shutter blades 28, 30 from the scene light admitting condition shown in FIG. 3, each of the pairs of sweep apertures 36, 37, respectively progressively coincide, to allow only that scene light which passes through the annular filter 74 to reach the photodetector 50. It is pointed out that this blade mechanism condition is not depicted in the present application but is shown in the last noted copending applications. In such condition, the blocking IR filter 74 serves to essentially block the IR, while the opaque portions of the shutter blades 28, 30 block passage of unfiltered light through the central lens filter portion 76. Of course, the IR filter 74 passes the visible frequencies. It is envisioned that this relationship of the shutter blades 28, 30 during moderate-to-high ambient light conditions and correspond to the primary aperture values being less than maximum. With the scene light being filtered by the IR filter 74, the potential of overexposing blue sky is eliminated. As noted in the last noted copending applications, a flash will be fired during this exposure and the reflected light thereof evaluated in accordance with the invention without the benefit of IR radiation; however, since the flash contribution under these levels of ambient light is not controlling, the lack of precise flash accuracy is tolerated in favor of ambient control.

Under conditions wherein ambient light is very low, the photocell detector in cooperation with the light integrating circuit reenergize the solenoid 60 at a later time to terminate exposure. Therefore, under low ambient light conditions, the shutter blades 28, 30 sweep beyond their position, as above described, and can move to the position shown in FIGS. 3 and 3A. In doing so, the central secondary sweep apertures 38 progressively coincide over the blocking visible filter 76 to define sweep aperture values which allow transmission of infrared spectral energy to the photocell detector 50 but exclude the visible spectral energy. It will be appreciated that the area defined by the coinciding sweep apertures 36, 37 close. Hence, only that scene light passing the central blocking visible filter 76 can reach the photocell detector 50. This blocking of visible frequencies continues until the aperture values defined by the secondary sweep apertures 38 eventually terminate. Termination occurs as the shutter blades 28, 30 continue to scan beyond their position depicted in FIG. 3 until the solenoid 60 is energized for driving the shutter blades to their scene light blocking condition. This continued scanning occurs when the level of scene brightness is lower than that which dictates the blade position in FIG. 3. Under this condition, the primary apertures continue to define their maximum effective diameter.

Since, under high ambient light conditions, the blade scan is terminated early, only the sweep apertures 36 and 37 provide aperture values over the photocell. Hence, the absorption filter 74 blocks, or precludes transmission of, IR radiation from the scene at such time. However, with lower ambient light levels, the secondary apertures 38 come into coincidence over the blocking visible filter lens 76 (while apertures 36 and 37 pass out of coincidence) as larger exposure values are formed. Accordingly, the shutter blades 28, 30 move to the position shown in FIG. 3 where the blocking visible filter 76 is employed for controlling spectral energy transmission to the photocell. Consequently, in the latter case, the scene light incident upon the photodetector is selectively filtered to block IR during the initial portion of the displacement of the shutter blades 28, 30 or that is, an initial portion of the exposure interval and then becomes unfiltered as opening 38 coincides so that the photocell then responds to only IR radiation during this subsequent portion of the displacement.

Hence, it should be understood that the filter system in conjunction with the blade mechanism provides means for automatically permitting transmission of visible light frequencies to the sensing or detecting means during at least one portion of the displacement of the blade mechanism or, that is, one portion of the exposure interval while substantially precluding transmission of the visible frequencies to the sensing means during another portion thereof.

Consequently, in accordance with this invention when the flash unit 66 is fired in situations of somewhat low ambient scene light (where the flash contribution to the resulting photograph is predominant as compared to the ambient contribution), the shutter blades 28, 30 will, during scanning, be positioned during the strobe flash with apertures 38 in coincidence so that the blocking visible filter 74 is in spectral filtering relationship to the photodetector. Thus, the photocell 44 is only responsive to the IR radiation. As a result, during the early stages of blade displacement, prior to the flash only visible light will be incident upon the photodetector while at the later stages of flash fire only the IR radiation is evaluated, such that the earlier mentioned difficulties encountered with flash firings will be substantially overcome. In this regard, objects viewed in the visible spectral region exhibit widely different light reflectivities while in contrast the near infrared region (e.g., 750-1200 nm) is characterized by relatively more uniform reflectivity for most common materials. Therefore, the IR reflectivity is much less dependent on the visible color (specific visible light absorption), and objects viewed by infrared are relatively independent of the reflectivity disparities earlier described. Thus, in scenes where differences in the visible reflectivities are present or which can be exaggerated by light sources such as flash bulbs or strobes, it is highly desirable to evaluate the IR radiation because, with such IR radiation, there will be less reflectivity differences between, for example, a subject's facial skin and the surrounding clothing or other objects. This substantially minimizes the degree of under or overexposure in such situations. It is, therefore, apparent that under flash conditions with exaggerated scene differences in reflectivities it is desirable to have the photocell detector respond to IR radiation.

Advantageously, in operation under high ambient light conditions, where the blades reach only small scanning aperture values, the novel system essentially precludes IR photocell reception and hence, IR evaluation. However, with lower ambient conditions, as the scan begins to reach larger aperture values, it reduces and subsequently eliminates IR filtering to provide reception wherein the visible light is blocked. Since the flash is usually fired at later rather than early stages of the scan, flash firing which assumes greater importance under lowered ambient conditions is thus coincident with the blocking visible filtered reception. Consequently, for this lower ambient condition, the initial, primarily ambient portion of the exposure interval is evaluated under essentially only visible light while during the flash portion of the interval the evaluation employs essentially infrared scene radiation.

Finally, it is to be understood that the secondary sweep apertures 39, 40 are arranged to travel in overlying relation to the photocell lens 42 in general and the IR filter 74 in specific during final scanning of the blades 28, 30 to a terminal position, not shown, but described in the last described invention. During this final stage of such scanning, the photocell detector is essentially responsive to the visible radiation since the IR frequencies are blocked out. Some of the visible scene light is filtered before the central apertures 38 pass out of coincidence over the visible blocking filter 76. This can occur when the primary apertures 32, 34 define a maximum primary aperture value. This blade mechanism position occurs when there is predominantly low ambient light, such as during early morning or late evening where the flash effect is negligible. This occurs, for example, when taking pictures of the Grand Canyon and objects in the scene are too remote to reflect a significant amount of the flash intensity. Under such conditions, it is preferred to return to scene evaluation excluding IR radiation. Consequently, the IR absorption filter is preferred for proper exposure.

It will be appreciated that this invention envisions use of a photocell lens having the top half portion made so as to block or absorb IR frequencies while passing visible frequencies and the lower half portion is made in a conventional fashion which can pass IR and block visible frequencies. The secondary sweep apertures would be, of course, formed so as to achieve the desired filtering control mentioned above during shutter blade scan or strobe. In this regard, for example, under high ambient light conditions an initial pair of cooperating sweep apertures would cooperate over the blocking IR filtered lens half; under relatively low ambient light light conditions, another pair of sweep apertures could coincide over the blocking visible lens half, while the first noted pair of secondary apertures would terminate or close their effective sweep aperture area. Should light conditions dictate that the blades continue to sweep beyond the condition last noted, such as under low or negligible ambient light and wherein the subject is beyond the effective range of the flash, then a third pair of coinciding sweep apertures could pass in overlying relation to the IR filter lens half while the noted second pair of sweep apertures close or terminate their effective sweep aperture area. Thus, it will be understood, of course, that the foregoing arrangement is designed to control the exposure as did the previously described arrangement.

Another embodiment of this invention is depicted in FIG. 5. This embodiment is similar to that disclosed in copending application Ser. No. 110,811 entitled "Apparatus For Varying the Spectral Filter Over the Photocell as a Function of Blade Position", by Milton S.

Dietz, and filed Jan. 10, 1980. Therefore, only a description of those components necessary for an understanding of this invention will be given insofar as more specific structural and operational characteristics thereof are described in the last noted application and are incorporated herein by reference. In essential respects, the presently described embodiment includes a pair of shutter blades, only one of which is shown at 78. The blade 78 is similar to that described in the noted application. With respect to the secondary sweep aperture 80, it includes as infrared blocking filter 82 at the leading portion thereof and differs from that described in the noted copending application by virtue of its use of a generally circular blocking visible filter 84 positioned in a generally circular opening defined by the aperture and adjacent the blocking IR filter 82. In this last noted application, the space presently occupied by the visible blocking filter 84 is without any filter. Of course, with use of the blocking visible filter 84, the photocell will be responsive only to the incident infrared frequencies during that portion of blade scan which, as noted, occurs when the blocking visible filter 84 is in overlapping relationship to a photodetector during low or negligible scene light, whereby when the flash strobe is fired and the IR radiation with its relatively uniform reflectivity response, as compared to visible reflectivity responses, is evaluated for eventual control of blade positioning as well as for causing termination of the exposure interval.

Referring now to FIG. 6, there is shown another embodiment of the present invention. This embodiment is similar to that disclosed in copending application Ser. No. 108,381 entitled "Method and Apparatus Employing Dual Photocells For Removing Spectral Filter During Strobe Pulse", by Bruce K. Johnson, and filed Dec. 31, 1979. Therefore, only a description of those components necessary for an understanding of this invention will be given insofar as the more specific structural and operational characteristics thereof are described in the last noted application and incorporated herein by reference. Essentially, this embodiment includes a pair of shutter blades 86, 88 spaced intermediate the photocell lens 90 and a pair of spaced apart photocell detectors 94, 96, preferably of the silicon photodiode type. Operatively connected to the dual photodetectors 94, 96 is the switching circuit (not shown), which controls operation of an exposure control circuit 98 in response to the firing of the flash, as described in greater detail in the last noted application. The scene light is controlled by the overlapping pairs of photocell sweep apertures (not shown). The photocell lens 90 is preferably, constructed as an integral unit, wherein top and bottom lens half portions direct the scene light to corresponding ones of photocell detectors 94, 96.

In the illustrated embodiment, a different photometric response for each of the photocell detectors 94, 96 is achieved by virtue of the upper lens portion 100 having a spectral filter 102, preferably an IR absorption filter connected to a rear lens surface thereof, while a lower lens portion 104 has connected to a rear surface thereof a blocking visible light spectral filter 106 which passes infrared frequencies. It is preferred that the spectral filter be a blocking infrared radiation filter of the type attenuating electromagnetic frequencies in the near IR region (e.g., 700-1200 nm), while the spectral filter attenuates frequencies in the visible range of the spectrum (i.e., 400-700 nm). Thus, the upper lens portion 100 including the blocking IR filter will transmit visible spectral energy to the exclusion of infrared spectral energy to the photodetector, whereas the lower lens portion 104 will transmit infrared to the exclusion of visible frequencies.

As noted, the pairs of secondary sweep apertures, respectively, control passage of scene light from the different lens portions 100, 104 to the corresponding photocell detectors 94, 96; respectively. Towards this end, the shutter blades 86, 88 are appropriately positioned relative to the photocell lens 90 to ensure that the pairs of secondary sweep apertures define effective aperture values which direct scene light in the manner mentioned above. Thus, the top half of the photocell lens 100 serves in an opposite fashion than the lower half; namely, it would block infrared frequencies while serving to pass visible light frequencies. This latter step occurs, of course, during the strobe fire period. It will be understood that in this embodiment that during exposure and prior to the flash being fired the exposure control circuit 98 is responsive to the photodetector 94 while at the commencement of and during flash fire the control circuit 98 is responsive to the photocell detector 96. Termination of flash as described in the last noted application resets the switch circuit of the exposure control circuit. Thus, during the strobe pulse, the exposure control circuit is responsive to the photocell detector 96 receiving infrared frequencies to the substantial exclusion of visible light. The advantages of this approach are apparent from the description of the beneficial results obtainable by exclusive use of IR frequencies during the strobe fire.

The light integrating unit generally described above provides an evaluation of scene radiation during an evaluation period which, in the illustrated embodiment, occurs essentially simultaneously with at least the initial stages of the exposure interval. Further, since the light integration only continues until the preselected voltage level for flash quench is reached, the actual length of the evaluation period is determined by the scene radiation; however, it should be understood that novel arrangements described herein are also applicable to pre-evaluation of scene lighting and to fixed periods of evaluation.

Since certain changes may be made in the above-described apparatus without departing from the scope of the invention herein involved, it is intended that all matter contained in the description thereof or shown in the accompanying drawings shall be interpreted as illustrative and not in a limiting sense.

What is claimed is:

1. In an exposure control system for use in a photographic camera having means for mounting photographic film material at a given focal plane, and means for directing image forming light rays from the scene to the focal plane, the system including means for unblocking and blocking passage of scene light along the exposure path, sensing means for evaluating radiation from said scene during an evaluation period, means responsive to the sensing means for controlling the unblocking and blocking means to provide an exposure interval in accordance with the evaluation by the sensing means, the improvement wherein:

the sensing means includes means for substantially evaluating spectral frequencies of scene radiation including visible spectral frequencies while excluding infrared frequencies during one portion of the evaluation period, said sensing means includes means for substantially evaluating spectral frequencies of scene radiation substantially exclusive of visible spectral frequencies and inclusive of infrared frequencies during at least another portion of the evaluation period.

2. The system of claim 1 wherein the sensing means includes means for evaluating scene radiation substantially exclusive of infrared frequencies during said one portion of the evaluation period which at least includes the portion preceding a pulse of illumination.

3. The system of claim 2 wherein said means for evaluating scene radiation substantially exclusive of infrared frequencies is also operable in still another portion of the period following the pulse of illumination.

4. The system of claim 3 wherein the sensing means includes a light sensing element, and selectively operative infrared blocking and visible light blocking filters, the infrared blocking filter substantially blocking passage of infrared frequencies from the scene to the element while substantially passing visible light frequencies, and the visible light blocking filter substantially passing infrared frequencies while substantially blocking the visible light frequencies.

5. In a photographic camera apparatus having means for mounting photographic film material at a given focal plane, means for directing image forming light rays from the scene along a given path to the focal plane, means for unblocking and blocking passage of scene light along the path, sensing means for evaluating radiation from said scene during an exposure interval, means responsive to the sensing means for controlling the unblocking and blocking means to provide an exposure interval in accordance with an accumulated total of scene radiation sensed by the sensing means, the improvement wherein:

the sensing means includes means, operatively cooperating with the unblocking and blocking means during the exposure interval, for evaluating visible spectral frequencies while excluding infrared frequencies during one portion of the exposure interval, said sensing means includes means for selectively excluding evaluation of substantially all visible spectral frequencies during at least another portion of the exposure interval while including infrared frequencies.

6. The camera of claim 5 wherein the sensing means includes means for substantially excluding evaluation of infrared frequencies during said one portion of the exposure interval which at least includes the portion preceding a pulse of illumination.

7. The camera of claim 6 wherein said means for substantially excluding evaluation of infrared frequencies is also operable in still another portion of the period following the pulse of illumination.

8. The camera of claim 7 wherein the sensing means includes a light sensing element and selectively operative infrared blocking and visible blocking filters, the infrared blocking filter substantially blocking infrared frequencies while substantially passing visible light frequencies, and the visible blocking filter substantially passing infrared frequencies while substantially blocking the visible light frequencies.

9. In a photographic camera apparatus including means for mounting photographic film material at a given focal plane, a light exposure opening for allowing passage of light to the film, a sensor for sensing scene light, a blade mechanism, means for mounting said blade mechanism for displacement between first and second positions to provide an exposure interval, flash means for producing a pulse of illumination directed at the scene for a short portion of the exposure interval, said blade mechanism precluding scene light from reaching the focal plane when in the first position, said blade mechanism defining primary aperture values enabling a range of changing apertures over said exposure opening when said blade mechanism moves toward said second position and also defining a plurality of discrete secondary aperture values enabling a range of changing aperture values for controlling the amount of scene light transmitted to said sensor as said blade mechanism moves to the second position, means for displacing said blade mechanism from the first position toward the second position and in response to the amount of scene light sensed by the sensor returning the blade mechanism to the first position, the improvement comprising:

transmission means responsive to movement of said blade mechanism for substantially permitting transmission of selected spectral frequencies to said sensor during the short portion of the interval while substantially precluding transmission of said selected frequencies during at least one other portion of said interval, said transmission means including a light evaluation opening through which scene light radiation is directed to the sensor, a blocking infrared filter located over one portion of said evaluation opening to block infrared frequencies while substantially passing visible spectral frequencies to said sensor and a visible blocking filter located over another portion of said evaluation opening to substantially block the visible light and pass infrared frequencies to said sensor, said secondary apertures being constructed and arranged so that during a complete scanning movement of the blade mechanism from the first to the second position, a first set of secondary aperture value is brought into coincidence over the blocking infrared filter portion for a first portion of the interval, a second set then is brought into coincidence over the blocking visible filter during the short portion of the interval while the first set is moved out of coincidence to thereby block passage of visible light through the filter, and finally a third set is brought into coincidence over the blocking IR filter portion while the second set is moved out of coincidence to thereby again block passage of infrared frequencies to said sensor.

10. In an exposure control system for use in a photographic camera having means for directing image forming rays from a scene along a given path to photographic film material mounted in the camera focal plane, said system including means for unblocking and blocking passage of scene light along said path to provide an exposure interval, means for sensing and summing scene radiation from said scene during the exposure interval, means responsive to said sensing and summing means for controlling said unblocking and blocking means to define an exposure interval selected in accordance with an accumulated total of scene radiation sensed by said sensing and summing means, flash means for producing a pulse of illumination directed at the scene during a portion of the exposure interval, the improvement wherein:

said sensing and summing means includes at least a pair of photoresponsive regions, each having photoresponsive characteristics different from the other with one of said regions substantially blocking infrared frequencies and passing visible frequencies and the other substantially blocking visible frequencies and passing infrared frequencies; and means for automatically employing each of said photoresponsive regions so that scene radiation is summed from said other region substantially during a flash portion of said exposure interval and from said one region during another portion of said exposure interval.

11. In a blade element for use in an exposure control system for photographic apparatus of the type having means for directing image forming light rays from a scene along a given path to a photographic film material mounted at a camera focal plane, means for sensing scene lighting conditions, means for displacing said blade element between first and second positions, said blade comprising a primary aperture configured to respectively unblock and block light passing along the given path, and a secondary aperture spaced from said primary aperture and constructed to control scene light admitted to the sensing means as the blade moves between the first and second positions, wherein the improvement comprises:

a spectral filter arrangement coupled to said blade to substantially preclude transmission of selected spectral frequencies while substantially transmitting other spectral frequencies through the secondary aperture to the sensing means as the blade is moved from the first to second positions, said filter arrangement including a visible blocking filter coupled to said blade to substantially preclude transmission of visible spectral frequencies through the secondary aperture during a latter portion of blade movement from the first to second positions.

12. A method of exposing photographic film comprising the steps of:

defining an exposure value by at least in part evaluating selected spectral frequencies of scene illumination essentially excluding frequencies in the visible range; and directing image forming light rays from a scene to be photographed along a given exposure path to photographic film material located at a given focal plane in accordance with the defined exposure value, said defining step comprises excluding evaluation of visible spectral frequencies during at least a part of an evaluation period and evaluating only infrared frequencies of scene illumination during said part of the evaluation period, said defining step includes evaluating scene illumination generally exclusive of visible radiation during one portion of said directing step and including evaluation of visible radiation during another portion thereof.

13. A method of exposing photographic film comprising the steps of:

initiating an exposure interval by directing image forming light rays from a scene to be photographed along a given exposure path to photographic film material located at a given focal plane;

directing artificial illumination at said scene during the exposure interval;

evaluating selected spectral frequencies of the scene illumination essentially excluding frequencies in the visible range at least during said illumination directing step, said evaluating step comprises evaluating only infrared frequencies of scene illumination at least during said illumination directing step; and responsive to said evaluating step, blocking said given exposure path to terminate said exposure interval.

14. The method of claim 13 wherein said illumination directing step includes directing a pulse of illumination at said scene during only a portion of said exposure interval, said evaluating step includes evaluating scene illumination generally exclusive of visible radiation during said flash illumination portion of said exposure interval and including visible radiation during another portion of said exposure interval, and said blocking step includes terminating said exposure interval responsive to both said evaluations of scene radiation.

15. In an exposure control system for use in a photographic apparatus having means for directing image forming light rays from a scene to a photographic film material mounted at a given focal plane, means for unblocking and blocking passage of the image forming rays to said focal plane, means for evaluating radiation from said scene during an evaluation period, and means responsive to said evaluation means for controlling the unblocking and blocking means to provide an exposure interval, the improvement wherein:

the evaluation means includes means for substantially evaluating spectral frequencies of scene radiation along a first path so as to substantially exclude visible spectral frequencies during at least one portion of the evaluation period, and said evaluation means includes means for evaluating essentially only said visible spectral frequencies along a second path during another portion of the evaluation period.

16. A method of exposing photographic film comprising the steps of:

initiating a scene light evaluation period by directing image forming scene light rays from a scene to be photographed to photographic film material located at a given focal plane;

evaluating selected spectral frequencies of the scene illumination along a first path by essentially excluding frequencies in the visible range at least during a portion of the evaluation period;

evaluating selected spectral frequencies of the scene illumination along a second path by essentially including only the frequencies in the visible range during another portion of the evaluation period; and blocking passage of image forming light rays from the scene to the film material in response to a predetermined intensity of evaluated scene light to thereby terminate the evaluation period.

* * * * *